United States Patent
Ananthapur Bache et al.

(10) Patent No.: US 10,169,604 B2
(45) Date of Patent: Jan. 1, 2019

(54) METHOD AND SYSTEM TO PREVENT ULTRASOUND DATA LEAKS IN MOBILE DEVICES

(71) Applicant: International Business Machines Corporation, Armonk, NY (US)

(72) Inventors: Vijay Kumar Ananthapur Bache, Bangalore (IN); Vijay Ekambaram, Tamilnadu (IN); Sarbajit K. Rakshit, Kolkata (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/376,737

(22) Filed: Dec. 13, 2016

(65) Prior Publication Data

US 2018/0167408 A1 Jun. 14, 2018

(51) Int. Cl.
*G06F 21/00* (2013.01)
*G06F 21/62* (2013.01)
*G10K 11/175* (2006.01)
*H04L 29/06* (2006.01)
*H04W 12/02* (2009.01)

(52) U.S. Cl.
CPC ........ *G06F 21/6218* (2013.01); *G10K 11/175* (2013.01); *H04L 63/0428* (2013.01); *H04L 63/162* (2013.01); *H04W 12/02* (2013.01)

(58) Field of Classification Search
CPC ............. H04L 63/1433; H04L 63/1416; H04L 63/0428; H04L 63/162; G06F 21/55; G06F 21/6218; G10K 11/175; H04W 12/02
See application file for complete search history.

(56) References Cited

U.S. PATENT DOCUMENTS

| | | | |
|---|---|---|---|
| 2014/0157420 A1* | 6/2014 | Guarnieri | G06F 21/562 726/25 |
| 2015/0244472 A1* | 8/2015 | Poppe | H04B 11/00 367/135 |

OTHER PUBLICATIONS

Lu, Kangjie, et al. "Checking More and Alerting Less: Detecting Privacy Leakages via Enhanced Data-flow Analysis and Peer Voting." NDSS. 2015. (Year: 2015).*

(Continued)

*Primary Examiner* — Yogesh Paliwal
(74) *Attorney, Agent, or Firm* — Robert Shatto; Hoffman Warnick LLC

(57) ABSTRACT

A system, method and program product for implementing an ultrasound security system for a mobile device. A system is described that that integrates with an operating system on a mobile computing device, and includes: an app flow analysis system that generates and maintains runtime flow graphs for apps running on the mobile device and analyzes the runtime flow graphs to identify a set of apps having confidential data flow application programming interfaces (APIs) in their execution paths; a detector that further evaluates the set of apps having confidential data flow APIs to identify a subset of vulnerable apps also having ultrasound emitting APIs; and a runtime correlation system that flags a vulnerable app as a potential data leak when a call to an ultrasound emitting API is detected from the vulnerable app. Also contemplated is a countermeasure system that broadcasts a temporal sound blocking signal to neutralize an ultrasound transmission from the vulnerable app.

20 Claims, 3 Drawing Sheets

(56) References Cited

OTHER PUBLICATIONS

Dickson, Brett William; "Wireless Communication Options for a Mobile Ultrasound System"; Thesis Submitted to the Faculty of the Worcester Polytechnic Institute; Aug. 2008; pp. 252.
Fontana, John; "Sound-initiated data exchange similar to Near Field Communications but without proximity requirements"; Illiri sound API aimed at secure mobile data exchange, log-ins, payments; Sep. 27, 2013; Copyright 2016 CBS Interactive; pp. 7.
Genkin, Daniel et al.; "RSA Key Extraction via Low-Bandwith Acoustic Cryptanalysis"; Acoustic cryptanalysis; pp. 17; <http://www.tau.ac.il/-tromer/acoustic/>.
Karapanos, Nikolaos; "Sound-Proof: Usable Two-Factgor Authentication Based on Ambient Sound"; USENIX; pp. 3; Copyright 2016 USENIX; <https://www.usenix.org/conference/usenixsecurity15/technical-sessions/presentation/karapanos>.
Lu, Kangjie; "Checking More and Alerting Less: Detecting Privacy Leakages via Enhanced Data-flow Analysis and Peer Voting"; NDSS '15; Feb. 2015; San Diego, CA; Copyright 2015 Internet Society; pp. 15; <http://dx.doi.org/10.14722/ndss.2015.23287>.
Storm, Darlene; "New attacks secretly use smartphone camera, speakers and microphones"; Security is Sexy; Aug. 20, 2014; pp. 4.
Ozhiganov; "NFC Alternative: Transferring Data Between Mobile Devices Using Ultrasound"; Oct. 9, 2013; pp. 7; <http://rdn.azoft.com/mobile-app-transering-data-using-ultrasound/>.
Unknown; "Using ambient sound as a two-factor authentication system"; Award-winning computer security news; Aug. 17, 2015; Copyright 1997-2016 Sophos Ltd.; pp. 11; <https://nakedsecurity.sophos.com/2015/08/17/using-ambient-sound-as-a-two-factor-authentication-system/>.

\* cited by examiner

METHOD AND SYSTEM TO PREVENT ULTRASOUND DATA LEAKS IN MOBILE DEVICES

TECHNICAL FIELD

The subject matter of this invention relates to ultrasound data transmissions with mobile devices, and more particularly to a system and method of preventing ultrasound data leaks among mobile devices.

BACKGROUND

Recently, mobile apps have been proposed that utilize ultrasonic sound waves (ultrasound) to transmit data among devices using the device's speaker and microphone. This technology, referred to as ultrasonic networking can transmit data at inaudible frequencies not perceptible to the humans. While this technology has potential for use in various applications because it allows for near field communications without additional hardware, ultrasound networking opens the door to potential data leaks in which malware loaded onto a mobile device can use ultrasound to illicitly transmit confidential information stored on the device.

Currently, firewalls exist to monitor and block illicit data transfers involving traditional communication schemes such as WIFI, LTE, 3G, 2G, Edge and Bluetooth. However, no such technology exists for ultrasonic networking.

SUMMARY

Aspects of the disclosure provide a system and method for intelligently blocking unwanted ultrasound signals originating from mobile devices.

A first aspect discloses an ultrasound security system that integrates with an operating system on a mobile computing device, and includes: an app flow analysis system that generates and maintains runtime flow graphs for apps running on the mobile device and analyzes the runtime flow graphs to identify a set of apps having confidential data flow application programming interfaces (APIs) in their execution paths; a detector that further evaluates the set of apps having confidential data flow APIs to identify a subset of vulnerable apps also having ultrasound emitting APIs; and a runtime correlation system that flags a vulnerable app as a potential data leak when a call to an ultrasound emitting API is detected from the vulnerable app. Also contemplated is a countermeasure system that broadcasts a temporal sound blocking signal to neutralize an ultrasound transmission from the vulnerable app.

A second aspect discloses a computer program product stored on a computer readable storage medium, which when executed by a computing system, provides an ultrasound security system that integrates with an operating system on a mobile computing device, the program product includes: program code that generates and maintains runtime flow graphs for apps running on the mobile device and analyzes the runtime flow graphs to identify a set of apps having confidential data flow application programming interfaces (APIs) in their execution paths; program code that further evaluates the set of apps having confidential data flow APIs to identify a subset of vulnerable apps also having ultrasound emitting APIs; and program code that flags a vulnerable app as a potential data leak when a call to an ultrasound emitting API is detected from the vulnerable app. Also contemplated is program code that broadcasts a temporal sound blocking signal to neutralize an ultrasound transmission from the vulnerable app.

A third aspect discloses a computerized method that provides ultrasound security on a mobile computing device, including: generating and maintaining runtime flow graphs for apps running on the mobile device; analyzing the runtime flow graphs to identify a set of apps having confidential data flow application programming interfaces (APIs) in their execution paths; further evaluating the set of apps having confidential data flow APIs to identify a subset of vulnerable apps also having ultrasound emitting APIs; flagging a vulnerable app as a potential data leak when a call to an ultrasound emitting API is detected from the vulnerable app; and broadcasting a temporal sound blocking signal to neutralize an ultrasound transmission from the vulnerable app.

BRIEF DESCRIPTION OF THE DRAWINGS

These and other features of this invention will be more readily understood from the following detailed description of the various aspects of the invention taken in conjunction with the accompanying drawings in which.

Figure 1:
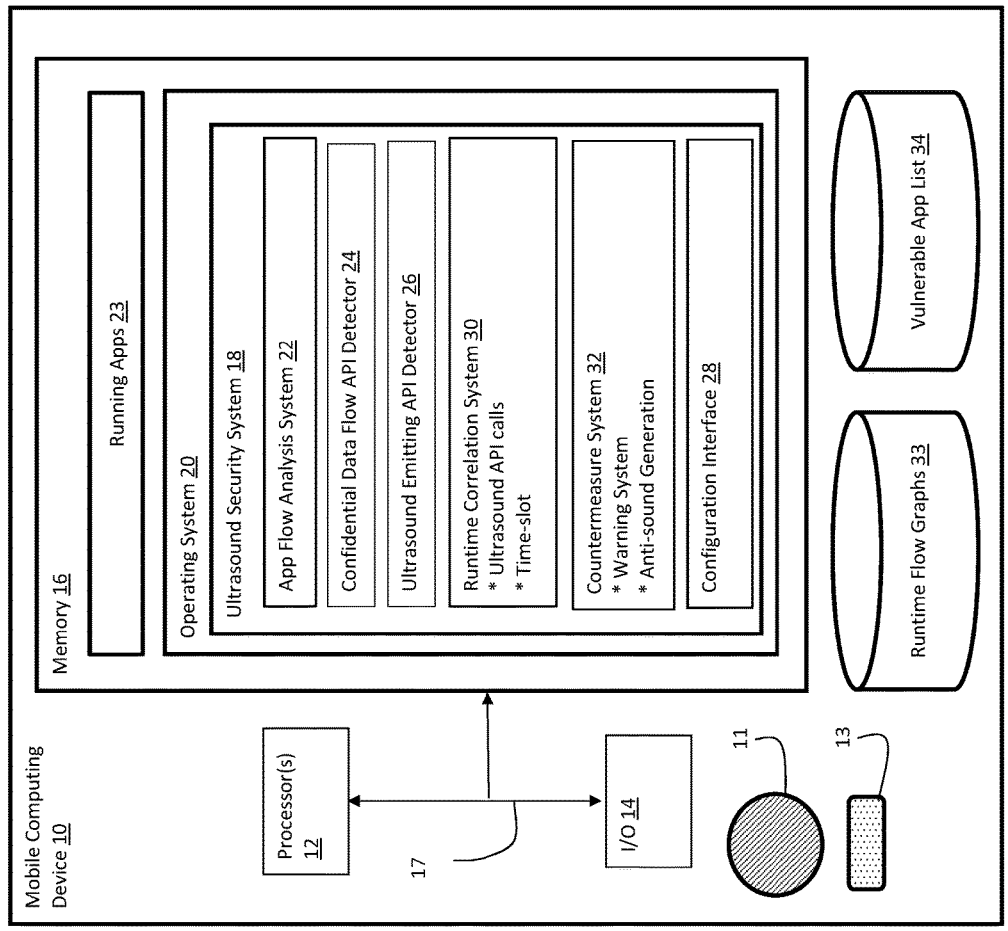
FIG. 1 shows a computing system having an ultrasound security system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a mobile computing device 10 having an ultrasound security system 18 integrated in the operating system 20. Mobile computing device 10 may comprise any type of smart device, smart phone, Internet of Things device, etc., having a speaker and which is capable of storing and running software applications or "apps". Ultrasound security system 18 identifies apps with potential data leaks by correlating confidential data flow application programming interfaces (APIs) with ultrasound API usage. In particular, system 18 correlates at runtime if (1) there is a running app with a detected execution path that includes an API call to access confidential data; and (2) while detected, that app makes an ultrasound-related API call. If such a correlation is observed, then the app is flagged as likely to involve an ultrasound data leak. Once flagged, ultrasound security system 18 can institute a countermeasure, e.g., broadcasting a temporal sound neutralizing signal via speaker 11 to block the leaking of confidential information.

To achieve the above, ultrasound security system 18 includes various components to identify which of the running apps 23 on the mobile computing device 10 have confidential data flow APIs, and which of those apps have ultrasound emitting APIs. App flow analysis system 22 may for example comprise a runtime agent that continuously analyzes running apps 23 to provide runtime flow graphs 33 (i.e., execution paths) of each running app 23.

Confidential data flow API detector 24 continuously evaluates the runtime flow graphs 33 to identify a set of the running apps 23 with execution paths having confidential data flow APIs that could possibly be used to leak data. For example, current execution paths in running apps 23 might have API calls that provide access to address book information, account information, photos, cache data, GPS coordinates, device ID, WiFi connection information, phone information, etc. The types of information that are deemed confidential may be predefined in a configurable table that can be hardcoded or managed via configuration interface 28. Techniques for evaluating flows during runtime to identify confidential information are known and are for example described, e.g., in known literature such as that found in https://iseclab.org/papers/egele-ndss11.pdf and http://wenke.gtisc.gatech.edu/papers/aapl.pdf.

In a similar manner, ultrasound emitting API detector 26 determines which of the set of apps having confidential data flow APIs also have ultrasound emitting APIs. This resulting subset of "vulnerable" apps may be stored in a dynamically maintained vulnerable app list 34. Thus, in the event that the confidential data flow ends or the app is terminated before an ultrasound emission occurs, then the app is removed from the vulnerable app list 34.

In a separate process, the subset of vulnerable apps having both confidential data flow APIs and ultrasound transmitting APIs is continuously monitored by runtime correlation system 30 to determine if an ultrasound emitting API is called. Such a call to an ultrasound emitting API from a vulnerable app indicates that an ultrasound transmission is about to occur from an app having a confidential data flow API. This correlation suggests a potential unwanted ultrasound data leak. Runtime correlation system 30 may also calculate the time-slot during which the ultrasound transmission is scheduled to occur by, e.g., analyzing the runtime flow graphs 33. For example, based on an evaluation of current execution paths, historical information, CPU speed, etc., it may be determined that the ultrasound transmission from a vulnerable app will occur in 5 seconds and last for 10 seconds.

In one illustrative embodiment, once a correlation of an ultrasound transmission from an app having a confidential data flow API is detected, countermeasure system 32 is launched. Countermeasure system 32 is engaged to, e.g., broadcast a temporal blocking "anti-sound" to block potential ultrasound data leaks. In this manner, ultrasound transmissions from an app are only blocked if a correlated confidential data flow API exists.

Depending on the implementation, countermeasure system 32 can be configured to warn the user, automatically block the transmission with anti-sound generation, or do nothing and allow it. A warning may for example include a pop-up visualization on a display of the mobile computing device 10 or, an audio alert, or a vibration. Once a warning is generated, the user has the option of preventing the transmission or allowing it, e.g., by clicking a button on the display otherwise providing some responsive feedback. When a warning is issued, the outputting of ultrasound data may be paused or blocked until the user either allows or disallows the transmission. If the user allows the transmission, then no blocking signal is broadcast.

If the ultrasound transmission is disallowed, either based on an auto-block setting or based on a response from the user after a warning is issued, an anti-sound blocking signal is broadcast to neutralize the transmission. Anti-sound generation may for example capture the originally transmitted ultrasound signal via microphone 13 and generate via speaker 11 a 180 degree phase shifted waveform of the captured signal. The phase shifted signal will for example cancel out or otherwise neutralize the original signal. Countermeasure system 32 may schedule a start and end time for the neutralizing broadcast based on the time-slot calculated by runtime correlation system 30.

Figure 2:
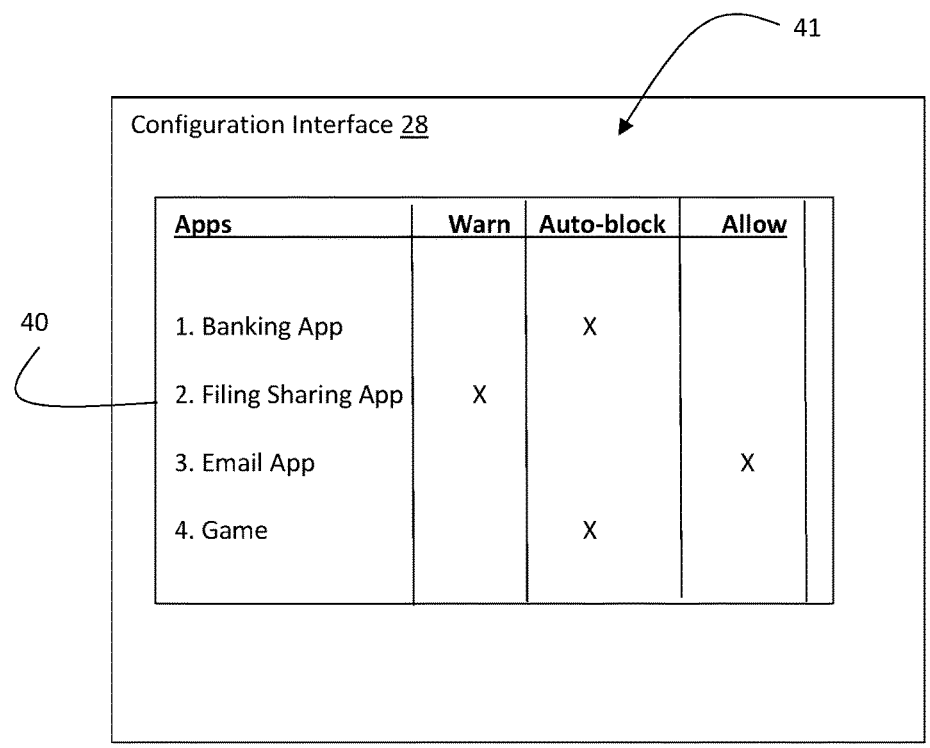
FIG. 2 shows a configuration interface according to embodiments.

Ultrasound security system 18 may also include a configuration interface 28 that allows the user to manage countermeasure settings for apps loaded on the mobile computing device 10. For example, FIG. 2 depicts an interface 28 having a window 40 through which the user can view a list of apps and assign a countermeasure setting 41 to each. In this example, the user can assign: a "warn" setting that will display or output a warning to the user when a correlation is detected; an "auto-block" setting that will automatically block any ultrasound transmission when a correlation is detected, and an "allow" setting that will always allow ultrasound transmissions for the app regardless of whether or not a correlation is detected.

Accordingly, ultrasound security system 18 provides a runtime process that monitors for a correlation between confidential data flow APIs and imminent ultrasound transmissions. In the described embodiment, imminent ultrasound transmissions are determined by monitoring for ultrasound related API calls in vulnerable apps. When an API call is detected to output ultrasound data in a vulnerable app, counter-measure system 32 is launched to take action. In an alternative embodiment, imminent ultrasound transmissions could be identified using other mechanisms, e.g., monitoring could be done using microphone 13 that listens for ultrasound data coming from a vulnerable app, etc.

Figure 3:
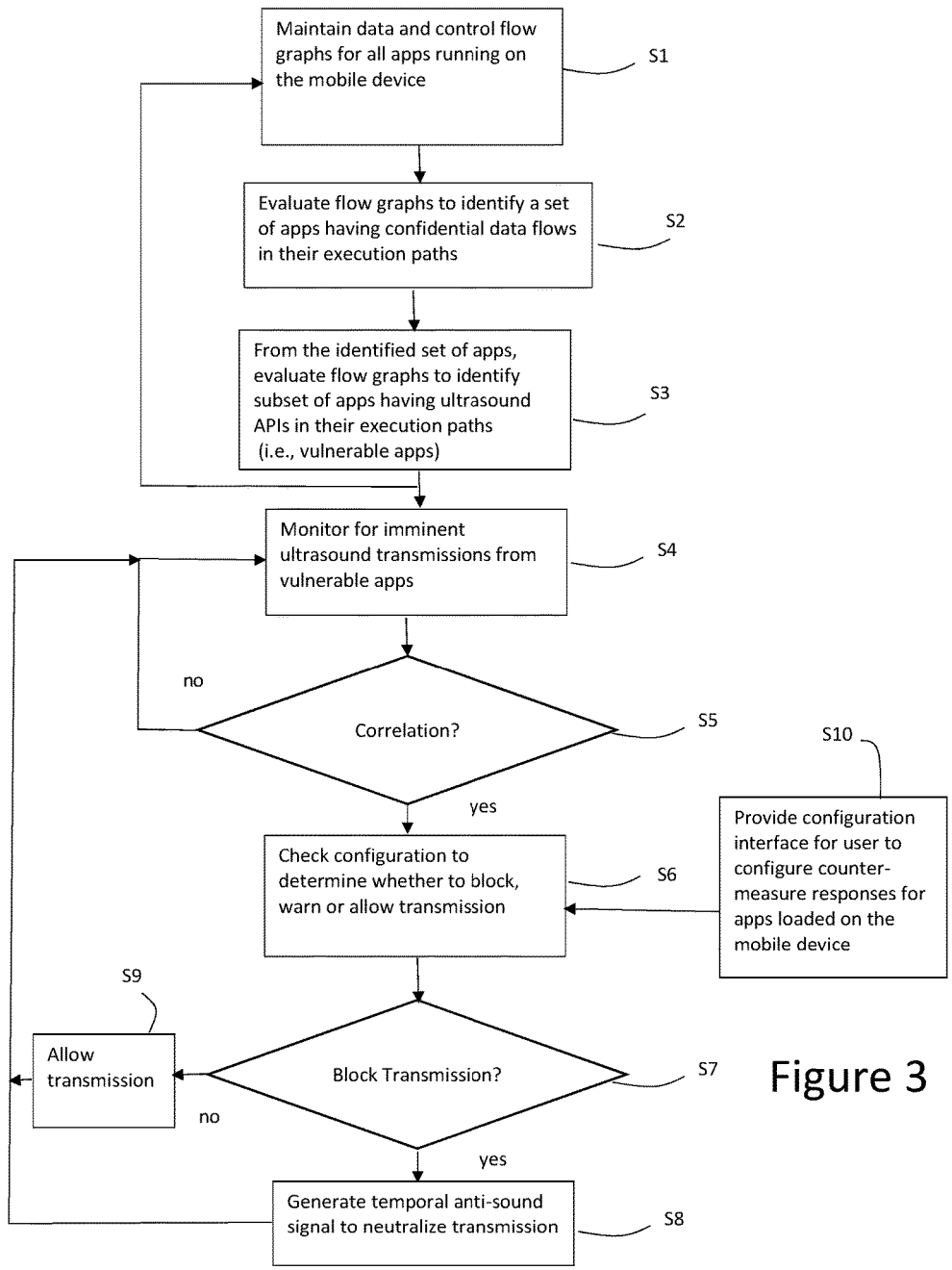
FIG. 3 shows a flow diagram for implementing ultrasound security according to embodiments.

FIG. 3 depicts a flow diagram of a process of implementing ultrasound security system 18. At S1, runtime (i.e., data and control) flow graphs are maintained for apps running the mobile device 10. At S2, runtime flow graphs are evaluated to identify a set of apps capable of leaking confidential information, i.e., ones that have confidential data flow APIs. At S3, from the set of apps, the process further evaluates runtime flow graphs to identify a subset of apps that also have ultrasound API's in their execution path, and dynamically maintains a list of vulnerable apps 34. Steps S1-S3 continuously execute, e.g., with a software agent integrated with the operating system 20, such that the vulnerable app list 34 is regularly updated.

At S4, a separate process monitors for imminent ultrasound transmissions from any of the list of vulnerable apps 34. An imminent ultrasound transmission may for example be determined by detecting a call to an ultrasound related API. At S5, a runtime determination is made whether a correlation exists, i.e., a vulnerable app is about to make an ultrasound transmission.

If no, the process loops for continued monitoring at S4; if yes, a predefined configuration established at S10 is checked to determine whether to block, warn or allow the transmission at S6 for the app. If, either directly or via a response to a warning, the transmission is to be blocked at S7, then an anti-sound signal may be scheduled and broadcast at S8 to neutralize the transmission. Otherwise, the transmission is allowed at S9. The process then loops back to S4 for further monitoring.

At any time, the user can edit the configuration interface 28 at S10 to configure a counter-measure response for each app loaded on the device (see FIG. 2), e.g., auto-block, warn, allow, etc.

For the purposes of this disclosure, the term API may refer to any piece of software code, subroutine definition, protocol, label, specification, object, data structure, framework, etc., that can be used to facilitate a particular functional operation within the mobile computing device 10.

It is understood that ultrasound security system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the ultrasound security system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An ultrasound security system that integrates with an operating system on a mobile computing device, and comprises:
   an app flow analysis system that generates and maintains runtime flow graphs for apps running on the mobile device and analyzes the runtime flow graphs to identify a set of apps having confidential data flow application programming interfaces (APIs) in their execution paths;
   a detector that further evaluates the set of apps having confidential data flow APIs to identify a subset of vulnerable apps also having ultrasound emitting APIs; and
   a runtime correlation system that flags a vulnerable app as a potential data leak when a call to an ultrasound emitting API is detected from the vulnerable app.

2. The ultrasound security system of claim 1, further comprising a countermeasure system that broadcasts a temporal sound blocking signal to neutralize an ultrasound transmission from the vulnerable app.

3. The ultrasound security system of claim 2, further comprising a configuration interface for selecting countermeasure settings for apps stored on the mobile device, wherein the countermeasure settings are selected from a group consisting of: auto-block, warn or allow.

4. The ultrasound security system of claim 2, wherein the countermeasure system determines a time slot for broadcasting the temporal sound blocking signal by analyzing the runtime flow graphs.

5. The ultrasound security system of claim 2, wherein the temporal sound blocking signal comprises a 180 degree phase shifted signal of a captured ultrasound signal.

6. The ultrasound security system of claim 2, wherein the countermeasure system includes generating a warning via a pop-up window.

7. The ultrasound security system of claim 6, wherein in response to the warning, an interface is provided to either block or allow an imminent ultrasound transmission.

8. A computer program product stored on a computer readable storage medium, which when executed by a computing system, provides an ultrasound security system that integrates with an operating system on a mobile computing device, the program product comprising:
   program code that generates and maintains runtime flow graphs for apps running on the mobile device and analyzes the runtime flow graphs to identify a set of apps having confidential data flow application programming interfaces (APIs) in their execution paths;
   program code that further evaluates the set of apps having confidential data flow APIs to identify a subset of vulnerable apps also having ultrasound emitting APIs; and
   program code that flags a vulnerable app as a potential data leak when a call to an ultrasound emitting API is detected from the vulnerable app.

9. The program product of claim 8, further comprising program code that broadcasts a temporal sound blocking signal to neutralize an ultrasound transmission from the vulnerable app.

10. The program product of claim 9, further comprising program code that determines a time slot for broadcasting the temporal sound blocking signal by analyzing the runtime flow graphs.

11. The program product of claim 9, wherein the temporal sound blocking signal comprises a 180 degree phase shifted signal of a captured ultrasound signal.

12. The program product of claim 8, further comprising a configuration interface for selecting countermeasure settings for apps stored on the mobile device, wherein the countermeasure settings are selected from a group consisting of: auto-block, warn or allow.

13. The program product of claim 8, further comprising program code for generating a warning via a pop-up window.

14. The program product of claim 13, herein in response to the warning, an interface is provided to either block or allow the ultrasound transmission.

15. A computerized method that provides ultrasound security on a mobile computing device, comprising:
   generating and maintaining runtime flow graphs for apps running on the mobile device;
   analyzing the runtime flow graphs to identify a set of apps having confidential data flow application programming interfaces (APIs) in their execution paths;
   further evaluating the set of apps having confidential data flow APIs to identify a subset of vulnerable apps also having ultrasound emitting APIs;
   flagging a vulnerable app as a potential data leak when a call to an ultrasound emitting API is detected from the vulnerable app; and
   broadcasting a temporal sound blocking signal to neutralize an ultrasound transmission from the vulnerable app.

16. The computerized method of claim 15, further comprising determining a time slot for broadcasting the temporal sound blocking signal by analyzing the runtime flow graphs.

17. The computerized method of claim 15, further comprising providing a configuration interface for selecting countermeasure settings for apps stored on the mobile device, wherein the countermeasure settings are selected from a group consisting of: auto-block, warn or allow.

18. The computerized method of claim 15, wherein the temporal sound blocking signal comprises a 180 degree phase shifted signal of a captured ultrasound signal.

19. The computerized method of claim 15, further comprising generating a warning via a pop-up window prior to broadcasting the temporal sound blocking signal.

20. The computerized method of claim 19, wherein, in response to the warning, providing an interface to either block or allow the ultrasound transmission.

\* \* \* \* \*